United States Patent Office 3,076,770
Patented Feb. 5, 1963

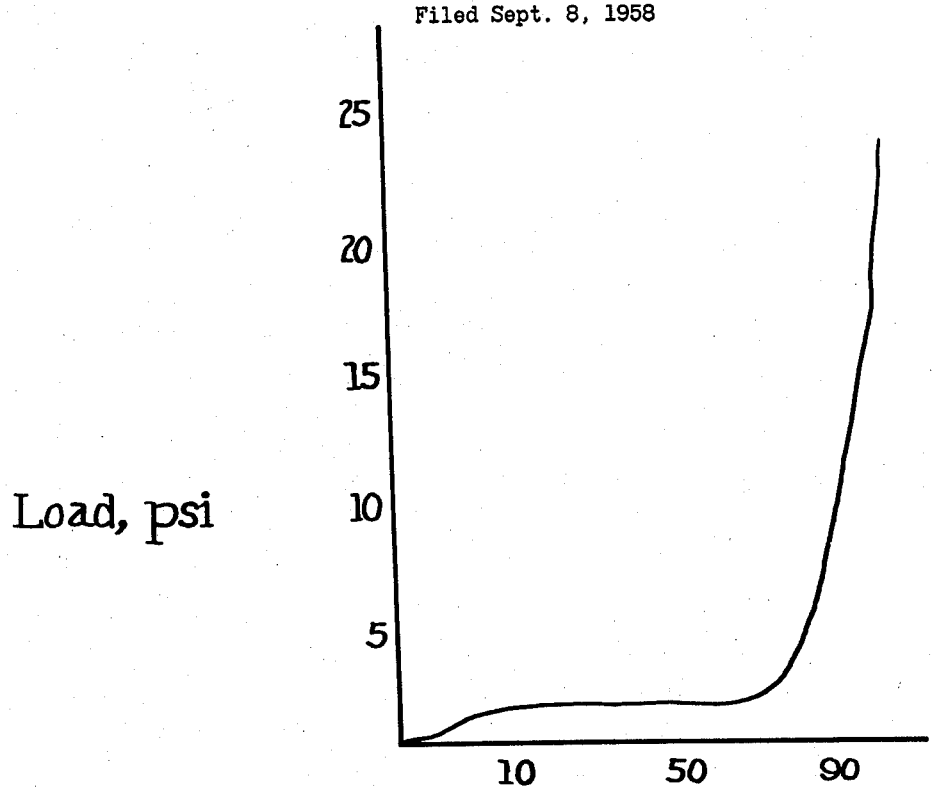

3,076,770
PREPARATION OF POLYURETHANE FOAM
James H. Saunders, John F. Szabat, and Andrew S. Morecroft, New Martinsville, W. Va., assignors to Mobay Chemical Company, Pittsburgh, Pa., a corporation of Delaware
Filed Sept. 8, 1958, Ser. No. 759,413
12 Claims. (Cl. 260—2.5)

This invention relates generally to the preparation of cellular polyurethanes or, in other words, polyurethane foams and, more particularly, to a novel cellular polyurethane and to a method for making it.

It has been proposed heretofore to prepare a cellular pollyurethane by reacting an organic polyisocyanate with an organic compound having reactive hydrogen atoms and water. It has always been the view that the organic compound having reactive hydrogens used in this reaction must be of relatively high molecular weight so it has been the practice to prepare cellular polyurethanes from polyesters, polyethylene ether glycols, polyester amides or the like having a molecular weight of at least 500. Depending upon the particular physical characteristics desired, the organic compounds having reactive hydrogens has been a substantially linear compound having only two reactive hydrogens per molecule or one which contains three or more reactive hydrogens per molecule. It has been known that the cellular polyurethane becomes progressively more rigid as the number of side chains resulting from the use of tri-functional compounds, such as, for example, trihydric alcohols in the preparation of the polyester or polyalkylene ether glycol increases. The heretofore available processes have, therefore, involved first the preparation of a high molecular weight polyester, polyalkylene ether glycol or the like and the subsequent reaction of this product with an organic polyisocyanate and water.

In one process in order to control the elasticity or rigidity of the product, it has been proposed to include a relatively minor amount of a trifunctional material along with the polyester in the reaction with the organic polyisocyanate. In this way, it is possible to build some side chains into the resulting polyurethane through the third hydroxyl group of the trihydric compound which may be either glycerol, trimethylol propane or the like.

It has been disclosed heretofore that a monomeric alcohol, such as methanol, glycerol, ethylene glycol or the like can be reacted with an organic polyisocyanate to make coatings, but it has never been thought that a suitable cellular polyurethane could be prepared from such materials without using a high molecular weight polyester or polyalkylene ether glycol or the like in conjunction with a monomeric triol, such as, trimethylol propane and the like. Ordinarily, the cellular product obtains its porous structure through the reaction of water with —NCO groups of any isocyanate present or —NCO groups present in the polyester, polyalkylene ether glycol or the like. Carbon dioxide is formed through the reaction of the —NCO groups with water and becomes entrapped in the viscous liquid to form bubbles which remain in the product as it solidifies. Supplementary blowing agents are not usually employed because best results can be obtained if all of the bubbles are formed as a result of the reaction betwen the —NCO groups and water. It has been proposed in one instance, however, to supplement the blowing action obtained with the carbon dioxide with volatile solvents which may be removed from the product at elevated temperatures and under reduced pressures. Such a process has not been found commercially successful, however, because of the inability to control the porosity of the product.

The products produced heretofore have had a density of from about one and one-half pounds per cubic foot up to about twenty pounds per cubic foot. Attempts to make lighter cellular polyurethanes from the polyesters and the polyalkylene ether glycols of the prior art have not been successful without the formation of a large number of undesirable large pores.

It is, therefore, an object of this invention to provide a method for making a cellular polyurethane having a substantially uniform pore structure and a density of less than about one and one-half pounds per cubic foot. Another object of the invention is to provide a method for making a rigid cellular polyurethane having a density of less than one and one-half pounds per cubic foot which is adapted for insulating purposes. Still another object of the invention is to provide a method for making cellular polyurethanes having a density of from about 0.5 to about 1.5 pounds per cubic foot which is a substantially rigid product and can be used to advantage for filling cavities without appreciably adding to the weight of the finished product. A still further object of the invention is to provide a method for making cellular polyurethanes from —NCO terminated reaction products that are substantially free from unreacted diisocyanate compounds and are therefore non-toxic. Still another object of the invention is to provide a novel cellular polyurethane energy absorbing packaging material.

Generally speaking, the foregoing objects and others are accomplished in accordance with the invention by providing a process for making a cellular polyurethane which involves reacting water with the —NCO terminated adduct formed by the reaction of an organic diisocyanate with a monomeric polyhydroxy alcohol having at least three terminal hydroxyl groups and dissolving the reaction product in a suitable organic solvent therefor having an appreciable vapor pressure at the temperature of the reaction mixture. Although it has been found that a product having the desired characteristics may be prepared from an adduct obtained solely by the reaction of a polyhydroxy alcohol having at least three hydroxyl groups with an organic diisocyanate, best results have been obtained so far when the cellular polyurethane is prepared from an —NCO terminated adduct which has been made by reacting a mixture of a monomeric polyhydroxy alcohol having at least three hydroxyl groups and a monomeric diol with tolylene diisocyanates. Preferably, the monomeric polyhydroxy alcohol having at least three hydroxyl groups is trimethylol propane and the monomeric diol is butylene glvcol.

Preferably, the cellular polyurethanes of the invention are produced in a two-step process. In the first step an organic diisocyanate such as a mixture of 2,4-tolylene diisocyanate and 2,6-tolylene diisocyanate are reacted with monomeric polyhydroxyl alcohols having at least three hydroxyl groups such as trimethylol propane or a mixture of monomeric polyhydroxy alcohols having at least three hydroxyl groups and monomeric diols. The diisocyanate is used in an excess so that all the hydroxyl groups of the monomeric polyhydroxy alcohols having at least three hydroxyl groups or a mixture of monomeric polyhydroxy alcohols having at least three hydroxyl groups and monomeric diols are reacted with an isocyanate group of the diisocyanates. Although the amount of diisocyanate used in excess of that required for reaction with the monomeric polyhydroxy alcohols having at least three hydroxyl groups may be varied over a wide range, it is necessary that a sufficient amount over that amount used to react with the reactive hydroxyl groups be utilized to maintain the —NCO terminated reaction product in solution unless another solvent for the —NCO terminated reaction product is included in the reaction mixture. If less than an equivalent amount of diisocyanate is provided, there is a tendency for an undesirable amount of cross-linking to occur through reaction between —NCO groups and the reactive hydrogen atom on the urethane linkage formed in the reaction between the diisocyanate and the monomeric polyhydroxy alcohols having at least three hydroxyl groups. Under most conditions, at least about 1.5 mols diisocyanate per hydroxyl group or reactive hydrogen atom in the monomeric polyhydroxy alcohols having at least three hydroxyl groups or the combined monomeric polyhydroxy alcohols having at least three hydroxyl groups and monomeric diols should be used to react therewith. A molar excess of about 200% has been found particularly advantageous and this amount is preferred. It has been found that the temperatures during the reaction period should preferably be within the range of from about 20° C. to about 100° C. and that the solution should be stirred as the reaction proceeds. After the reaction has been carried out between the diisocyanate and the monomeric polyhydroxy alcohol having at least three hydroxyl groups or the mixture of monomeric polyhydroxy alcohols having at least three hydroxyl groups and monomeric diols, the excess diisocyanate is stripped off by any suitable means and the solid —NCO terminated adduct remains. The solid —NCO terminated adduct contains about 80 percent or more by weight of the theoretical amount of available —NCO groups and less than 2 percent unreacted diisocyanate. In all cases, the diisocyanate content must be so low that people working with it are not affected by it as, for example, by irritation. Distillation should be carried out for a short period of time at a temperature of about 150° C. and under conditions which avoid quiescence. The —NCO terminated adduct or prepolymer substantially free from unreacted monomeric diisocyanate is then dissolved in a suitable solvent therefor and in a separate step is reacted with water to produce a cellular polyurethane.

Any suitable diisocyanate may be used in the invention. Suitable diisocyanates are, for example, the cycloaliphatic, aliphatic heteroaliphatic and aromatic diisocyanates such as, thiodipropyl diisocyanate, chlorophenylene diisocyanate, ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 3,3'-dimethyl-4,4'-biphenylene diisocyanate, 3,3'-diphenyl-4,4'-biphenylene diisocyanate, 4,4'-diphenylene diisocyanate, 3,3'-dichloro-4,4'-biphenylene diisocyanate and 1,5-naphthalene diisocyanate, diisothiocyanates and monoisocyanate-monoisothiocyanates, i.e., any compound of the general formula XCNRNCY wherein X and Y are selected from the group consisting of sulfur and oxygen and R is a divalent radical and tolylene diisocyanates. The tolylene diisocyanates are, for example, the 2,4-tolylene diisocyanate and 2,6-tolylene diisocyanate and mixtures thereof. The diisocyanates should be reacted with a monomeric polyhydroxy alcohol having at least three hydroxyl groups or the monomeric polyhydroxy alcohol having at least three hydroxyl groups and monomeric diol mixtures in the proportions of at least one mol of diisocyanate per available hydroxyl group. The reaction products have a relatively low vapor pressure and are thus not undesirable because of their toxicity. Best results have been obtained so far by using a 80:20 ratio mixture of the 2,4-tolylene diisocyanate and 2,6-tolylene diisocyanates.

Any suitable monomeric polyhydroxy alcohol having at least three hydroxyl groups may be used in the invention. Examples of such suitable monomeric polyhydroxy alcohols having at least three hydroxyl groups are those having a molecular weight of less than about 150 and being highly branched such as, for example, glycerol, trimethylol propane and pentaerythritol and the like. It has also been found highly desirable to mix a low molecular weight saturated or unsaturated monomeric diol such as 1,4- or 1,3-butylene glycol with the highly branched monomeric polyhydroxy alcohol having at least three hydroxyl groups. Other suitable monomeric diols are for example, thiodiglycol, 1,6-hexanediol, 1,3-propylene glycol, ethylene glycol, diethylene glycol 2,2'-dimethyl-1,3-propylene glycol and the like. Best results have so far been obtained in using trimethylol propane in a 70:30 ratio with 1,3-butylene glycol. However, the polyhydric alcohol having at least three hydroxyl groups such as, for example, trimethylol propane may be mixed with the monomeric diol, such as, for example, 1,4-butylene glycol in a ratio of from about 70:30 to about 30:70.

Any suitable organic solvent may be used for the —NCO terminated adduct. Examples of such suitable organic solvents are those having a vapor pressure at the reaction temperature of the —NCO terminated adduct and water so that the majority of the solvent is volatilized during the reaction. The solvent should be inactive towards the —NCO groups of the —NCO terminated adduct and also be relatively free from water so that the —NCO terminated adduct solution should be storage stable. The solution of the —NCO terminated adduct should contain from about 60 percent to about 90 percent of the —NCO terminated adduct dissolved in from about 40 to about 10 percent solvent. It has been found that ethyl acetate and methyl ethyl ketone are the best solvents. In fact, a preferred embodiment employs a 75 percent solution of an —NCO terminated adduct prepared by reaction of about 30 parts 1,3-butylene glycol and about 70 parts trimethylol propane with an excess of 2,4-toluylene diisocyanate or 2,6-toluylene diisocyanate or a mixture thereof in ethyl acetate. Solvents having a boiling point from about 35° C. to about 150° C. may be used. Other such suitable solvents are, for example, methylene chloride, acetone, xylene, Cellosolve acetate, methyl acetate, methyl ethyl ketone and the like.

The amount of water which is added should be sufficient to react with all the isocyanate groups remaining after the reaction of the monomeric polyhydroxy alcohol having at least three hydroxyl groups with the organic diisocyanate, but preferably not in too large an excess. If more water is added than is necessary for reaction with the isocyanate groups, the excess water will cause the reaction to stop at the amine stage due to the lack of sufficient isocyanate and prevent molecular growth and the resulting foam will have poor physical properties. If an insufficient amount of water is added to react with all of the free isocyanate groups, these isocyanate groups will not react with water to give $CO_2$ and the foam will be denser due to lack of blowing. For these reasons the amount of water used should be stoichiometrically calculated on the free isocyanate groups of the —NCO terminated adduct and any free monomeric isocyanate present and a large excess should be avoided.

Any suitable tertiary amine catalyst which accelerates the reaction between the isocyanate groups and water may be used in the foaming reaction. It is desirable to use tertiary amines having relatively low volatility so that they remain in the reaction mixture until the foaming reaction is completed. Catalysts which may be used are any suitable tertiary amine such as, triethylamine, pyridine, quinoline, 2-pyrrolidene, 3-methylisoquinoline, dimethylhexahydroaniline, N-ethyl morpholine, diethylhexahydroaniline, 1-methyl-4-,4' dimethyl amino ethyl piperazine, and the reaction products of N,N'-diethylaminoethanol and phenylisocyanate and the like.

It is frequently desirable to use an additional additive to control the cell size. Any suitable additive may be used, such as, for example, a plasticizing agent such as, didecyl phthalate, a surface active agent such as silicone oil.

The cellular polyurethanes of the invention have improved insulating properties over the heretofore commercially available insulating materials and, furthermore, they are generally much lighter in weight. Consequently, they offer a considerable weight saving where weight is of particular importance. It is possible to apply this type of material for insulation of various pieces of equipment, pipe, etc. with a minimum amount of labor. For example, a metal foil mold may be built around a pipe and the foaming mixture poured into the mold. It foams up inside the mold and cures in place almost immediately without any additional heating. Asbestos may be used in place of the metal foil. The material may also be used to furnish insulation inside a formed body. For example, a refrigerator door has an inner and outer side. The mixed —NCO terminated adduct solution and water reaction mixture may be poured into the compartment between the sides and permitted to foam, thereby filling the cavity and producing a light weight, well insulated refrigerator door. Obviously these cellular polyurethanes may be molded in any desired shape, or readily cut into desired shapes from preformed blocks or sheets. This foam has an advantage over the foams of the prior art in that it has outstanding heat distortion properties and low densities making it particularly well suited for insulation of steam pipes, for example.

Still other unique properties of the cellular polyurethane of the invention, in addition to the exceptionally light density, are a compression strength of about 4 pounds per square inch from about 10% to about 70% deflection and a water absorption of about 50% by volume. The cellular polyurethane plastic provided by the present invention comprises a predominately open cell structure, usually of from about 85% to about 95% open cells. This structure accounts for its high water absorption and also to its unexpected high heat resistance. The cellular polyurethane plastic of this invention has been placed in an oven at 200° C. for a period up to about two weeks without any showing of distortion. Moreover, at even higher temperatures, the cellular polyurethane plastic has been free of distortion. Such higher temperatures are in the range of about 240° C., however, the cellular plastic will begin to discolor at temperatures of about 200° C.

Because of the high solvent content in the compound having free isocyanate groups, the solvent must escape before the cellular polyurethane is subjected to high temperatures. Due to the open cell structure, substantially all of the solvent will escape in about 3 days at room temperature. At 70° C. and in an air circulation oven, substantially all of the solvent will escape in about 3 hours. As the solvent escapes, a corresponding shrinkage occurs in the cellular plastic which amounts to about 6 percent from the linear mold dimensions. The shrinkage is uniform in all directions and, therefore, may be easily allowed for.

The cellular polyurethane plastic provided by this invention is an excellent energy absorber and its use has been found particularly advantageous as a cushioning material in packaging. The load-deflection curve of the cellular polyurethane provided by the invention discloses that the compression slowly builds up to about 4 pounds per square inch after about 10% deflection and is substantially constant at about 4 pounds per square inch until the cellular plastic has been deflected to about 70%. Thereafter, the compression rapidly increases in nonlinear manner as shown in the accompanying drawing.

In order to better describe and further clarify the invention, the following are specific embodiments thereof; the parts being by weight if not otherwise stated.

*Example 1*

About 30 parts 1,3-butylene glycol and about 70 parts trimethylol propane are reacted with not less than 200 parts of toluylene diisocyanate in the ratio of about 80 percent 2,4-toluylene diisocyanate to 20 percent 2,6-toluylene diisocyanate to produce a reaction mixture containing 30 percent —NCO terminated adduct from butylene glycol and 70 percent —NCO terminated adduct from trimethylol propane. Excess toluylene diisocyanate is stripped off by heating the reaction mixture above the boiling point of toluylene diisocyanate at a pressure of about 20 mm. of mercury. The prepolymer mixture when dry contains less than 1 percent free toluylene diisocyanate, preferably about 0.5 percent. 75 parts of the —NCO terminated adduct mixture are dissolved into 25 parts of ethyl acetate and the resulting —NCO terminated adduct solution is placed into a quart cardboard container and mixed on a drill press or other suitable mixing means with about 5 parts didecyl phthalate, about 10 parts of a polyester of linoleic acid and ethylene glycol, about 2 parts permethylated triethylene tetramine and about 1.87 parts of water and stirred at about 300 r.p.m. until the reaction mixture starts to resemble whipped cream. Mixing is then stopped and the foaming mixture is poured into a mold. The cellular polyurethane rises in about 55 seconds and is tack free almost immediately. The cellular polyurethane has a partially open cell structure and the density is about 0.94 lb. per cubic foot. The product does not become distorted at temperatures up to about 200° C.

*Example 2*

About 100 parts of trimethylol propane are reacted with not less than about 200 parts toluylene diisocyanate in the ratio of 80 percent 2,4-toluylene diisocyanate to 20 percent 2,6-toluylene diisocyanate to form an —NCO terminated adduct of trimethylol propane and toluylene diisocyanate. The excess toluylene diisocyanate is stripped off by heating to a temperature above the boiling point of the toluylene diisocyanate under a reduced pressure of about 20 mm. of mercury until the reaction product is substantially dry. The dry reaction product is then dissolved in ethyl acetate in a ratio of about 25 parts ethyl acetate to about 75 parts —NCO terminated adduct.

About 100 parts of the resulting —NCO terminated adduct solution is heated to a temperature of from about 26° C. to about 50° C. and mixed according to Example 1 with about 5 parts didecyl phthalate, about 10 parts of a polyester obtained by condensing linoleic acid and ethylene glycol, about 2 parts triethyl amine and about 3 parts of water. The cellular polyurethane formed has a density of about .66 lb. per cubic foot.

*Example 3*

About 30 parts ethylene glycol and about 70 parts trimethylol propane are reacted in place of the 1,3-butylene glycol and trimethylol propane according to the process of Example 1 and foamed to produce a cellular polyurethane. The cellular polyurethane when subjected to a temperature of about 200° C. did not lose its shape.

*Example 4*

About 30 parts 1,4-butylene glycol and 70 parts trimethylol propane are reacted in place of the 1,3 butylene glycol and trimethylol propane according to the process of Example 1 and foamed to form a cellular polyurethane. The low density cellular polyurethane when subjected to heat of a temperature of about 200° C. does not lose its shape.

*Example 5*

About 29.8 parts of 1,3-butylene glycol, about 14.1 parts 1,4-butylene glycol and 56.1 parts trimethylol propane are reacted in place of the 1,3-butylene glycol and trimethylol propane according to the process of Example 1 and foamed to produce a cellular polyurethane. The cellular polyurethane has outstanding physical properties.

*Example 6*

About 29.8 parts 1,3-butylene glycol, about 7.1 parts 1,4-butylene glycol and about 63.1 parts trimethylol propane are reacted in place of the 1,3-butylene glycol and trimethylol propane according to the process of Example 1 and foamed to produce a cellular polyurethane.

Example 7

About 30 parts 1,3-butylene glycol and about 70 parts trimethylol propane are reacted with not less than 200 parts of tolylene diisocyanate in the ratio of about 65 percent 2,4-tolylene diisocyanate to about 35 percent 2,6-tolylene diisocyanate according to the process of Example 1 and foamed to produce a cellular polyurethane.

Example 8

About 100 parts trimethylol propane and about 200 parts of toluylene diisocyanate are dissolved in ethyl acetate and heated to reflux temperature for about 3 hours. A reaction mixture in ethyl acetate was obtained which could be foamed as seen in Example 1. The reaction product was toxic as some monomeric toluylene diisocyanate was present.

Example 9

About 100 parts of the —NCO terminated adduct solution described in Example 1 is mixed according to Example 1 with about 8 parts of didecyl phthalate, about 3 parts N-ethyl morpholine, about 2.57 parts water and about 2 parts 2-pyrrolidine. The cellular polyurethane produced had a density of about 0.78 pound per cubic foot and a heat distortion of about 220° C. The foam has a uniform cell structure and was a predominately open cell structure.

Example 10

About 100 parts of the —NCO terminated adduct solution described in Example 1 and about 8 parts didecyl phthalate are mixed together for about 15 minutes under a blanket of nitrogen and using an agitation of about 300 revolutions per minute or less. After admixing the —NCO terminated adduct solution and didecyl phthalate, the —NCO terminate adduct solution is foamed by adding about one part of a tertiary amine catalyst, about 2.56 parts of water and about 2 parts or 2 pyrrolidine or N-ethyl morpholine. The properties obtained in the foam produced by machine mixing have very good physical properties including a very low density, such as, for example, about 0.8 pound per cubic foot, a tensile strength of about 9 pounds per square inch and a high heat of distortion of about 200° C. If the didecyl phthalate is deleted from the foamable mixture larger and more irregular cell structure is noted in the cellular polyurethane. Also the use of 2-pyrrolidine had an advantage over the use of N-ethyl morpholine, in being practically odorless and promoting better cell structure. A cube of foam produced in this manner was placed in a test chamber at about 195° F. and having humidity of about 100 percent for a period of 13 days with no noticeable distortion of shape. If a machine is used to mix the foaming materials the tank and lines of the mixing chamber and storage vessel have to be cleaned of all material reactive with the free isocyanate groups of the —NCO terminated adduct. The machine lines and tank are purged out with a solvent such as ethyl acetate before and after the use of —NCO terminated adduct reaction mixture.

Example 11

Foam made according to Example 2 was poured into a mold 22½ inches long made for 4 inch pipe out of metal foil. The insulation made in this mold is approximately 2 inches thick. The mold was heated to a temperature of about 40° C. and the foaming material charged in for about 2 seconds. The resultant density of the foam is about 1.6 pounds overall. Demolding was possible in about 1 minute and 30 seconds after the foam charge was placed in the mold. After removing the molded foam from the mold it is cool to the touch. Dependent upon storage conditions there may be about a 6 percent linear shrinkage from mold dimension over the next few days. This period of time can be reduced by elevated temperature storage without fear of distortion of the polyurethane foam.

It is to be understood that any of the organic diisocyanates or monomeric polyhydroxy alcohols having at least three hydroxyl groups or monomeric diols or catalyst or solvents or auxiliary compounds disclosed as operable herein can be substituted in the foregoing working examples for the specific compounds set forth therein.

Although the invention has been described in considerable detail in the foregoing examples for the purpose of illustration, it is to be understood that such detail is solely for this purpose and that variations can be made therein by those skilled in the art without departing from the spirit and scope of the invention except as set forth in the claims.

We claim:

1. The process which comprises reacting water and an —NCO terminated reaction product of a polyhydric alcohol having at least three hydroxyl groups and a molecular weight of less than about 150 with an organic polyisocyanate while said reaction product is dissolved in an organic solvent therefor, said reaction being effected at a temperature at which said solvent has a vapor pressure whereby a major amount of said solvent volatilizes and under reaction conditions such that gas becomes entrapped in the reaction mixture and a solidified cellular polyurethane is formed.

2. The process which comprises reacting a polyhydric alcohol having at least three hydroxyl groups and a molecular weight of less than about 150 with an organic polyisocyanate to form an —NCO terminated reaction product, dissolving the said product in an organic solvent therefor having a boiling point of from about 35° C. to about 150° C., and reacting said reaction product while dissolved in the solvent with water at a temperature at which said solvent has a vapor pressure whereby a major amount of the solvent is volatilized and under conditions whereby gas becomes entrapped in the reaction mixture and a cellular polyurethane is formed.

3. The process of claim 1 wherein the polyhydric alcohol is a mixture of trimethylolpropane and butylene glycol.

4. The process which comprises reacting water with an —NCO terminated reaction product prepared by a process which comprises reacting an organic polyisocyanate and a polyhydric alcohol having at least three hydroxyl groups and a molecular weight of less than about 150 while said reaction product is dissolved in an organic solvent therefor, the ratio of reaction product and solvent being from about 60 parts to about 90 parts reaction product and from about 40 parts to about 10 parts solvent, said solvent having a boiling point of from about 35° C. to about 150° C., said reaction being conducted at a temperature at which said solvent has a vapor pressure whereby a major amount of the solvent is volatilized and under conditions which result in gas becoming entrapped in the reaction mixture with the formation of a solid cellular polyurethane.

5. The process of claim 4 wherein the polyhydric alcohol is a mixture of a glycol and a polyhydric alcohol having at least three hydroxyl groups in a ratio of about 30 parts to about 70 parts glycol and about 70 parts to about 30 parts said polyhydric alcohol.

6. The process which comprises reacting water and an —NCO terminated reaction product dissolved in ethyl acetate, the said reaction being conducted at a temperature at which the ethyl acetate has a vapor pressure whereby a major amount of the ethyl acetate is volatilized and under conditions such that gas becomes entrapped in the reaction mixture with the formation of a solid polyurethane, the solution of said adduct in ethyl acetate containing from about 60 parts to about 90 parts reaction product, said reaction product having been prepared by a process which comprises reacting trimethylolpropane and 1,3 butanediol with an excess of organic diisocyanate over that required to react with all of the hydroxyl groups of the said alcohols.

7. The process of claim 1 wherein the said reaction product has been stripped free from any polyisocyanate present before the reaction with the water.

8. The process of claim 1 wherein the polyhydric alcohol is selected from the group consisting of glycerol, trimethylolpropane and pentaerythritol.

9. The process of claim 8 wherein the solvent is ethyl acetate and the diisocyanate is toluylene diisocyanate.

10. The process of claim 6 wherein the organic diisocyanate is toluylene diisocyanate.

11. The process of claim 2 wherein the polyhydric alcohol is a mixture of trimethylol propane and 1,3-butanediol and the diisocyanate is toluylene diisocyanate.

12. A method for making a cellular polyurethane which comprises reacting water with an —NCO terminated reaction product dissolved in an organic solvent therefor, said reaction product having been prepared by a process which comprises reacting a polyhydric alcohol having a molecular weight of less than about 150 and having at least three hydroxyl groups and a low molecular weight monomeric dihydric alcohol with an organic polyisocyanate, said reaction with water being effected at a temperature at which said solvent has a vapor pressure whereby a major amount of said solvent volatilizes and under reaction conditions such that gas becomes entrapped in the reaction mixture and a solidified cellular polyurethane is formed.

References Cited in the file of this patent

UNITED STATES PATENTS

| | | |
|---|---|---|
| 2,577,281 | Simon et al. | Dec. 4, 1951 |
| 2,764,565 | Hoppe et al. | Sept. 25, 1956 |
| 2,855,421 | Bunge et al. | Oct. 7, 1958 |
| 2,866,774 | Price | Dec. 30, 1958 |
| 2,867,278 | Mallory et al. | Jan. 6, 1959 |
| 2,936,293 | Orth | May 10, 1960 |

FOREIGN PATENTS

| | | |
|---|---|---|
| 870,400 | Germany | Mar. 12, 1953 |
| 205,456 | Australia | Jan. 4, 1957 |